(12) United States Patent
Pecht et al.

(10) Patent No.: US 8,494,807 B2
(45) Date of Patent: Jul. 23, 2013

(54) PROGNOSTICS AND HEALTH MANAGEMENT IMPLEMENTATION FOR SELF COGNIZANT ELECTRONIC PRODUCTS

(75) Inventors: Michael G. Pecht, College Park, MD (US); Jie Gu, San Jose, CA (US)

(73) Assignee: Oxfordian LLC, Dallas, TX (US)

( * ) Notice: Subject to any disclaimer, the term of this patent is extended or adjusted under 35 U.S.C. 154(b) by 239 days.

(21) Appl. No.: 12/657,250

(22) Filed: Jan. 15, 2010

(65) Prior Publication Data
US 2010/0191503 A1 Jul. 29, 2010

Related U.S. Application Data

(60) Provisional application No. 61/205,774, filed on Jan. 23, 2009, provisional application No. 61/205,763, filed on Jan. 23, 2009.

(51) Int. Cl.
*G06F 17/18* (2006.01)
(52) U.S. Cl.
USPC ......................................................... 702/179
(58) Field of Classification Search
USPC ......................................................... 702/179
See application file for complete search history.

(56) References Cited

U.S. PATENT DOCUMENTS

| | | | |
|---|---|---|---|
| 6,826,575 B1 * | 11/2004 | Waclawski | 1/1 |
| 6,892,317 B1 * | 5/2005 | Sampath et al. | 714/4.3 |
| 7,457,785 B1 * | 11/2008 | Greitzer et al. | 706/12 |
| 8,260,271 B2 * | 9/2012 | Rosenberg et al. | 455/414.1 |
| 2006/0235707 A1 * | 10/2006 | Goldstein et al. | 705/1 |
| 2007/0220368 A1 * | 9/2007 | Jaw et al. | 714/48 |
| 2008/0141072 A1 * | 6/2008 | Kalgren et al. | 714/33 |
| 2010/0042872 A1 * | 2/2010 | Colclough et al. | 714/26 |

OTHER PUBLICATIONS

Schimert, James; "Data-Driven Fault Detection Based on Process Monitoring using Dimension Reduction Techniques"; Jan. 1, 2008; IEEE AC; Paper # 1636, Version 9; p. 1-3.*
Friedman, Jerome & Tukey, John; "A projection pursuit algorithm for exploratory data analysis"; Sep. 1974; IEEE Transactions on Computers; vol. c-23, No. 9; p. 1.*

* cited by examiner

*Primary Examiner* — Aditya Bhat
(74) *Attorney, Agent, or Firm* — Lawrence Edelman; The Law Office of Lawrence Edelman

(57) ABSTRACT

The present invention provides a method to implement prognostics and health management (PHM) in individual electronic products (such as parts, components, boards, assemblies, devices, systems, and systems of systems). The PHM algorithm is performed during product screening tests, diagnostic processes, or after the manufacturer process. Certain performance, signal values and parameters, environmental and operational loads, or their correlations are recorded, extracted, and stored in electronic memory for that particular product. The stored data represents a the healthy baseline reference of that particular product at the initial point of its life. In one embodiment, where the healthy baseline is stored in the product, it can be updated according to different usage conditions. In one embodiment with the data is stored within the product, the PHM analysis can be performed in the field under conditions of use. In another embodiment the healthy baseline can be stored elsewhere and the product returned to the company storing the healthy baseline data, for PHM analysis.

16 Claims, 5 Drawing Sheets

PROGNOSTICS AND HEALTH MANAGEMENT IMPLEMENTATION FOR SELF COGNIZANT ELECTRONIC PRODUCTS

CROSS REFERENCE TO RELATED CASE

This application claims priority to U.S. Provisional Application Ser. No. 61/205,774, filed Jan. 23, 2009, entitled Prognostics and Health Management Implementation for Individual Electronic Products, which application is incorporated by reference as if fully set forth herein.

This application also relates to Provisional Application Ser. No. 61/205,763 filed Jan. 23, 2009, entitled A Prognostic Method for Aging Systems, Michael Pecht and Shunfeng Cheng, inventors.

BACKGROUND OF THE INVENTION

1. Field of the Invention

The present invention relates to a method for determining the quality and reliability of electronic components and electronic component containing systems. More specifically, the present invention relates to a method for determining the quality of an individual electronic component or product in the manufacturing line and/or the reliability of the individual electronic component or product in the field, during use, based on its own "healthy" product baseline, which can be obtained during or after manufacture.

2. Description of the Related Art

Electronic components are integral to the functionality of most products and systems today, and their reliability is often critical to system reliability. There has, therefore, been a growing interest in monitoring the ongoing "health" of individual electronic component products and systems in order to predict failures and provide warning to avoid catastrophic failure. Here, the degree of health of a product is defined as the extent of degradation or deviation of a product's performance from an expected normal aging condition.

Assessing the extent of deviation or degradation from an expected normal operating condition (i.e., health) for electronic products provides information that can be used to meet several critical goals, which include (1) providing advance warning of failures; (2) recording and predicting intermittent product failures and analyzing products returned from the field that, for example, exhibit No Trouble Found (NTF) symptoms; (3) minimizing unscheduled maintenance, extending maintenance cycles, and maintaining product effectiveness through timely repair actions; (4) reducing the life-cycle cost of equipment by decreasing inspection costs, downtime, and inventory; (5) extending the life of existing products; and (6) improving qualification, assisting in the design of new systems, and providing logistical support of fielded and future systems.

In prognostic methods described in U.S. Pat. Nos. 6,950,773; 7,162,393 and 7,171,586 the healthy baseline for a product is determined with reference to databases containing performance information for similar products. Then, measured performance, signal values and calculated signal parameters are recorded, along with environmental and operational loads, or their correlations for a particular product, and then compared with this healthy baseline to detect anomalies or degradation. However, the disadvantages of this approach are several. First, components inside the electronic products or software/firmware of the products may be changed or updated, requiring re-training in order to establish a new healthy baseline. Second, the healthy baseline will often not be valid if the usage conditions are not sufficiently similar to the training conditions. Third, it is difficult to cover all conditions of use when building the healthy baseline, since user environments and behaviors may vary significantly.

Hence, what is needed is a method that establishes a healthy baseline using data obtained from the product itself. This healthy baseline can be updated as necessary using different testing, operational or environmental conditions. Then, by subsequently recording the performance, signal values, and calculated parameters, environmental and operational loads, and comparing these outputs and their correlations to their own individually generated and updated healthy baseline, it is possible to identify the actual health of the product at any time and to use this data for subsequent health management and prognostic goals.

SUMMARY OF THE INVENTION

The present invention provides a method for implementation of Prognostics and Health Management (PHM) for individual electronic components products and systems using their own healthy baselines. The healthy baseline can be created in the manufacturing process to serve as a fingerprint for future diagnostics and prognostics. The recorded performance, signal values, and calculated parameters, environmental and operational loads or their correlations either in some steps in manufacturing, or in the field or after product return, can then be compared with the healthy baseline of the individual component, product, or system to detect anomalies or degradation, or failure prediction.

In one embodiment, the healthy baseline can be created after manufacture of the component, product, or system.

In another embodiment, the healthy baseline can be stored in the product or in a company's database.

In yet another embodiment, the PHM algorithm used to obtain the healthy baseline can also be stored in the product or in a company database.

In a still further embodiment, when both the healthy baseline and PHM algorithm are stored in the product, the healthy baseline can be updated by extracting and recording signal parameters, comparing the data to that of the healthy baseline, and from that calculating a performance, as well as monitoring and recording environmental and operational loads, or their correlations during usage or at stages in the product life cycle. Performance refers to product performance per the product specification, such as speed, data transfer rate, generated heat and so on. Signal values for electronic products can include, but are not limited to, such parameters as current, voltage, power, resistance, capacitance, and impedance. Signal parameters can refer to the features calculated from time series signal values, such as mean, range, ramp rate, frequency, correlations and the like.

In yet another variation, the performance and signal values and parameters, environmental and operational loads, or their correlations can be recorded over certain time intervals, and saved for example, in the form of a calculated metric, such as a distribution mean, a standard deviation, a maximal value, a minimal value, kurtosis, skewness, root mean square, number of occurrences above a set threshold, a cycle mean, a cycle range, a cycle ramp rate, a natural frequency, Mahalanobis distance value, a principal components analysis value, a residual value, a covariance, a correlation factor, obtained from a regression analysis or some multivariate state estimation technique. The usage data monitored and recorded for the product can include, but need not be limited to, environmental conditions (such as temperature, humidity, vibration, bending, thermal shock, chemical, radiation, and/or biological exposure) and operational conditions (such as current, voltage, and power, mechanical usage profiles).

BRIEF DESCRIPTION OF THE DRAWINGS

So that the above-recited features of the present invention can be understood in more detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
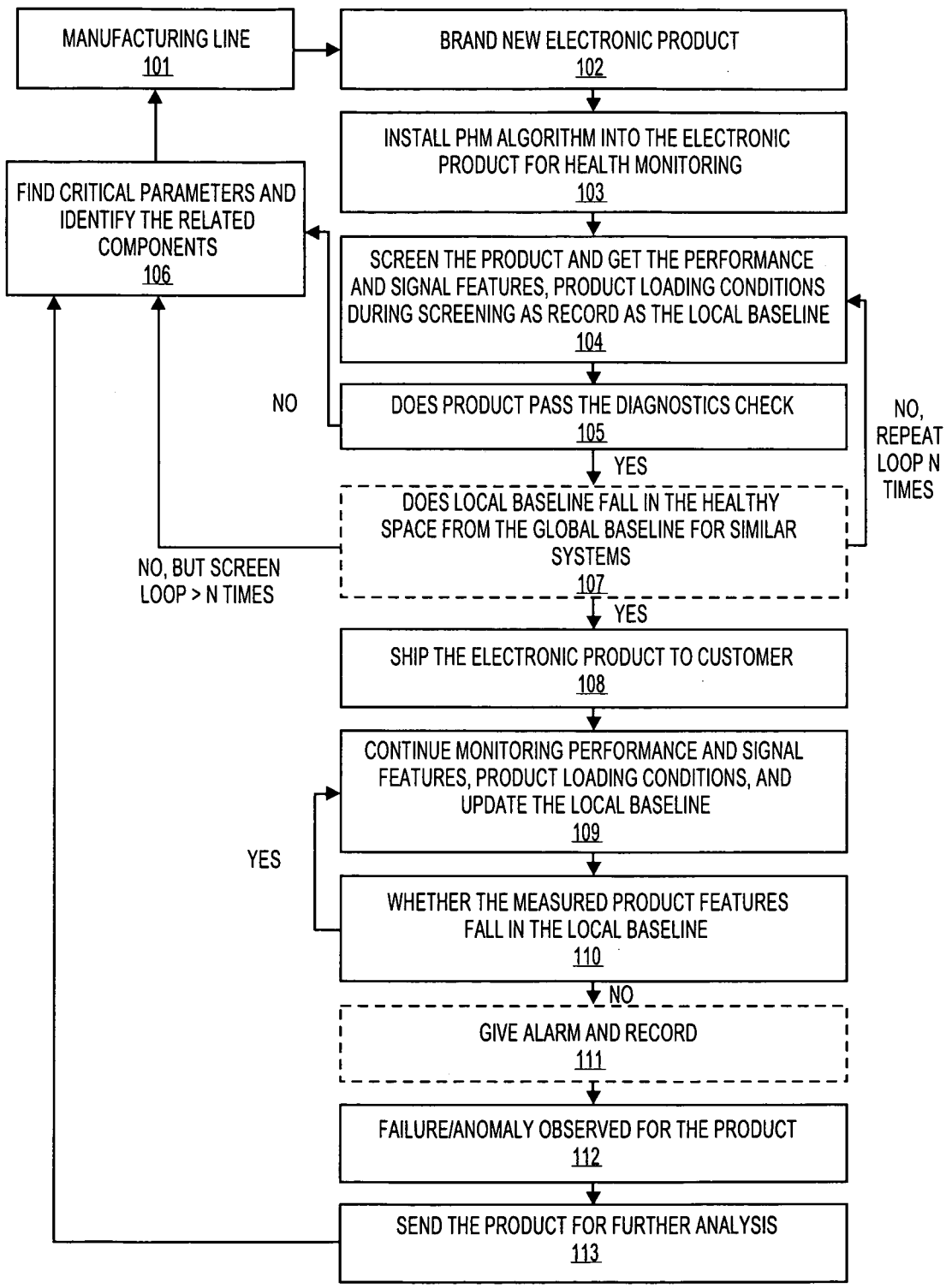
FIG. 1 presents a logic flow chart illustrating in detail one embodiment of a process for monitoring the health of an electronic product.

With reference now to FIG. 1, illustrated is an exemplary case of the overall approach after an electronic component, product, or system (102) is produced at the end of the manufacturing line (101). Before the product is sent to screening, a Prognostics and Health Management algorithm is installed with the product (103). This may be in the form of software loaded into the memory of a chip, or microprocessor, an Erasable Programmable Read Only Memory (EPROM), Flash memory chip, and the like, or hard wired in the form of a specialized circuit. During the screening process, wherein the product is tested to confirm that it meets performance specifications, the performance/signal data and product loading conditions are collected, and the features then extracted from the data values of one or more of these measured parameters. These features can be stored in a memory, chip, hard drive, or Bios built into the product and loaded as the local healthy baseline (104). The healthy baseline may also include and comprise a more global healthy baseline, one built from several local healthy baselines for the same electronic product.

In the next step, a check is made to see whether the electronic product passes a screening and diagnostics check (105). If it does not pass this check, the critical parameters are identified and are correlated to the related physical components (106). At this stage, the electronic product will be sent back to the manufacturing line (101) for re-work.

When the electronic product passes the screening and diagnostics check, it is then sent for a feature check (107). If the local healthy baseline recorded during the screening and diagnostics procedure fails to fall within the healthy space of the global healthy baseline for similar systems, the screening process will again be performed and the features again extracted to build the new local healthy baseline. If a product continually fails, that is, if it fails the feature check N times (the value N depends on the experience for different products), then the electronic product will be sent for further analysis (106). If the product passes the feature check, it can then be shipped to the customer (108).

During customer usage, performance data, signal and product loading conditions data are continually captured, recorded and extracted as features, such as performance and/or signal features (109). The features recorded during such customer usage are then compared to the stored local healthy baseline to detect any anomalies or degradation (110). If a new incoming feature falls into the space of the local healthy baseline, it will be used to update the local healthy baseline (109). If not, signifying that anomalies or degradation are being detected, the system algorithm will issue a warning alarm and record this information (111) for future diagnostics and prognostics purposes. This information will also be useful for NTF (No Trouble Found) detection of products after they have been sent back to the manufacturer or repair station for further analysis. Alternatively, the product can be analyzed by the customer with the assistance of the manufacturer.

When the actual failure or performance degradation of a product is observed (112), the user can return the product to the manufacturer/company, repair station or contact customer service (113). Then the company, repair station or the user under the company's guidance can run the PHM algorithm again to extract the features and compare that with the global base line for that product (or the local healthy baseline, if available) to find the critical parameters and identify the related failed components.

Some steps described in FIG. 1 are not absolutely necessary, and they are indicated by dashed line boxes in the figure. However, if these steps are included in the prognostic process, they can bring additional benefits to the process. For example, one can skip step 107 and go from step 105 to step 108 directly. However, if step 107 is included, one can check the product quality in the product screening or diagnostics process by comparing the performance, signal values and parameters, environmental and operational loads, or their correlations from the local healthy baseline with the global healthy baseline. One can also skip step 111 and go from step 110 to step 112 directly. However, if one includes step 111, one can receive an advance warning of failure and schedule maintenance in advance.

Figure 2:
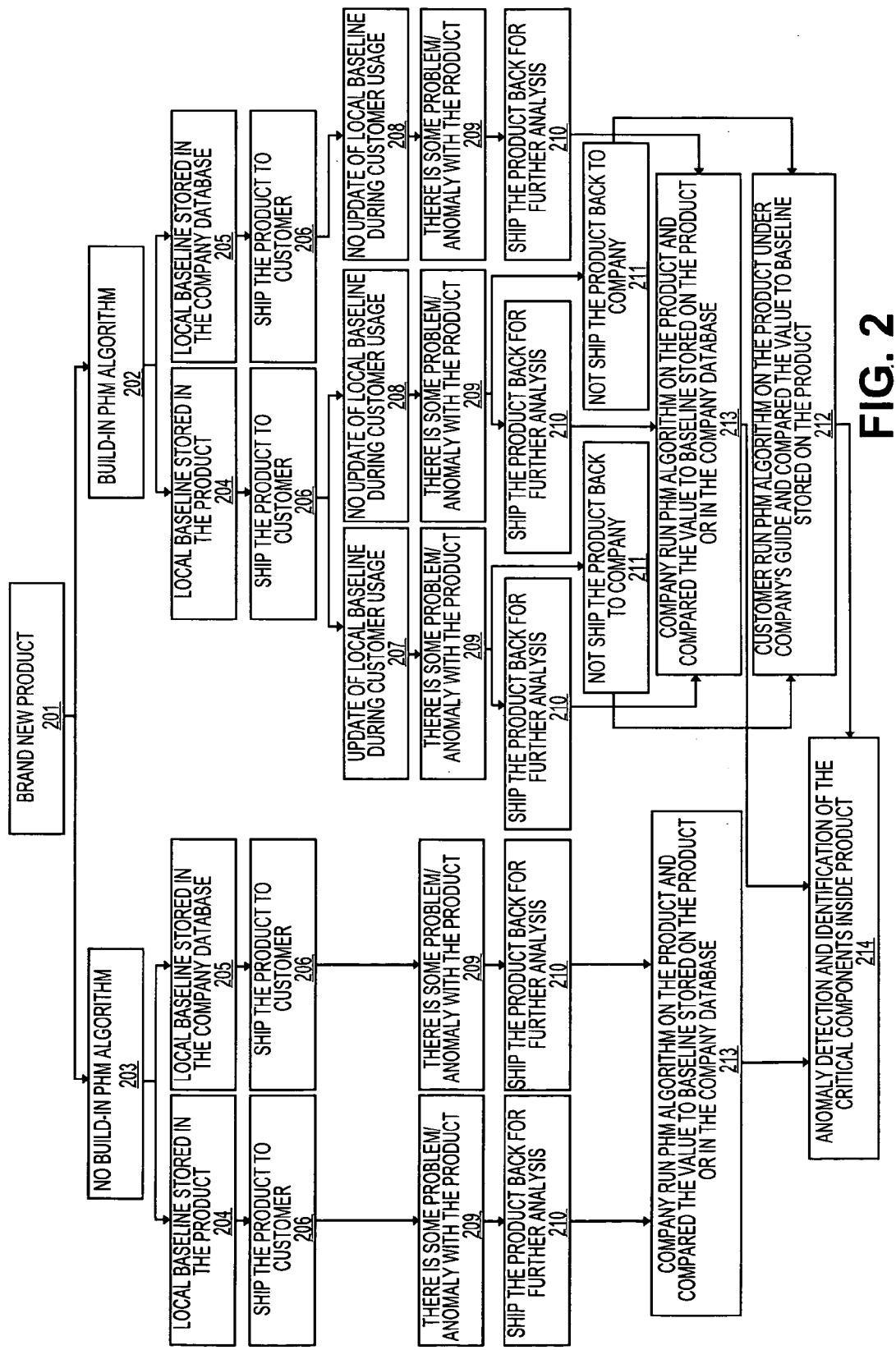
FIG. 2 presents a flow chart illustrating the overall process for implementation of a prognostics approach to electronic product health.

FIG. 1 provides an exemplary case illustrating an overall approach, but the overall approach need not be so limited. FIG. 2 shows to alternative paths which may generally be used. For a new product (201) such as an electronic system, one can provide a built-in PHM algorithm (e.g., with an embedded chip) (202) or store the PHM algorithm remotely (203). One can also choose whether the local healthy baseline is stored in the product (204) or remotely, such as in a company database (205). Under product usage conditions, if there is a built-in PHM algorithm and a locally stored healthy baseline, one can also choose whether to update the database in the usage condition (207) or not (208). Then, after a failure or an anomaly is observed in the product, one can choose whether to ship the product back to the manufacturer. If the product is shipped back (210), the company can run the PHM algorithm in the product and compare the value to the healthy baseline stored in the product or in a company database (213) for anomaly detection and identification of the critical components inside the product (214). If the product is not shipped back to company, the customer can run the embedded PHM algorithm, typically under the company's guidance and compare the value to a healthy baseline stored in the product (212) for anomaly detection and identification of the critical components inside the product (214). If this still does not solve the problem, then the product can be shipped back to the company for further diagnostics and analysis.

Figure 3:
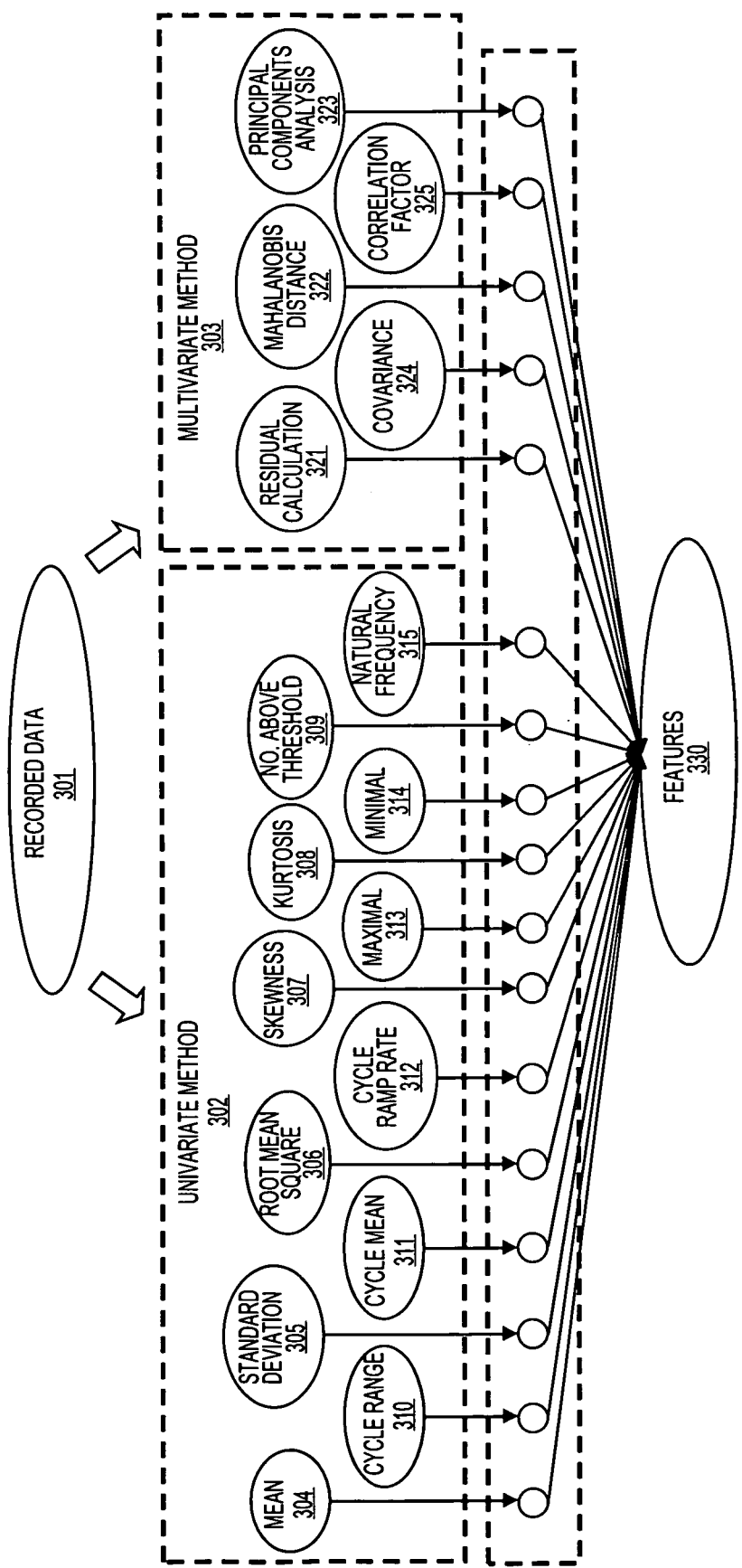
FIG. 3 illustrates the feature extraction process using a calculated matrix.

After recording for example performance data and signal data, the next, subsequently performed step is feature extraction. A feature can be derived in two ways. One is to employ a univariate method, which deals with a single parameter signal. The other is to employ a multivariate method, which deals with multiple parameters at the same time and considers correlations between these parameters. FIG. 3, by way of illustration, presents a variety of feature extraction methodologies which can be applied to the original recorded data (301). Which one of the different approaches is to be used in a specific case for a specific product is to be determined by the product manufacture, and does not constitute a part of this invention. In FIG. 3, for the univariate method (302), data features can be analyzed using mathematically based analytical techniques such as, but not limited distribution mean (304), standard deviation (305), root mean square (306), skewness (307), kurtosis (308), number of occurrences above the threshold (309), cycle range (310), cycle mean (311), cycle ramp rate (312), maximal value (313), minimal value (314), and natural frequency (315) in the frequency domain. In the multivariate method (303), data features that can be examined include, but are not limited to, residual value obtained from regression analysis or multivariate state estimation techniques (321), Mahalanobis distance value (322), principal components analysis value (323), covariance (324), and correlation factor (325).

After observing the product failure or anomaly, it is necessary to look for the critical parameters and identify the related physical parameters. This can be done by, for example, using Projection Pursuit Analysis (PPA). The idea of projection pursuit is to locate the projections from high dimensional space (multi-parameters) to low dimensional space (the most critical parameters) that reveal the most details about the structure of the data set. A more detailed description of PPA can be found in the paper: Sachin Kumar, Vasilis Sotiris, and Michael Pecht, Health Assessment of Electronic Products using Mahalanobis Distance and Projection Pursuit Analysis, International Journal of Computer, Information, and Systems Science, and Engineering, Vol. 2 (4), pp. 242-250. Other methods for checking whether the local healthy baseline falls within the healthy parameters of the global healthy baseline, and whether newly recorded and/or calculated performance and/or signal values and parameters fall within the local healthy baseline, can include test of T-distribution, test of the mean shifts, test of the standard deviation shifts, test of the kurtosis shifts, test of the skewness shifts, test of the number of outliers, sequential probability ratio test, statistical process control, test of the Mahalanobis distance value shifts, test of the change of correlations between different parameters, and test of the residual value obtained from regression analysis or multivariate state estimation technique shift.

Figure 4:
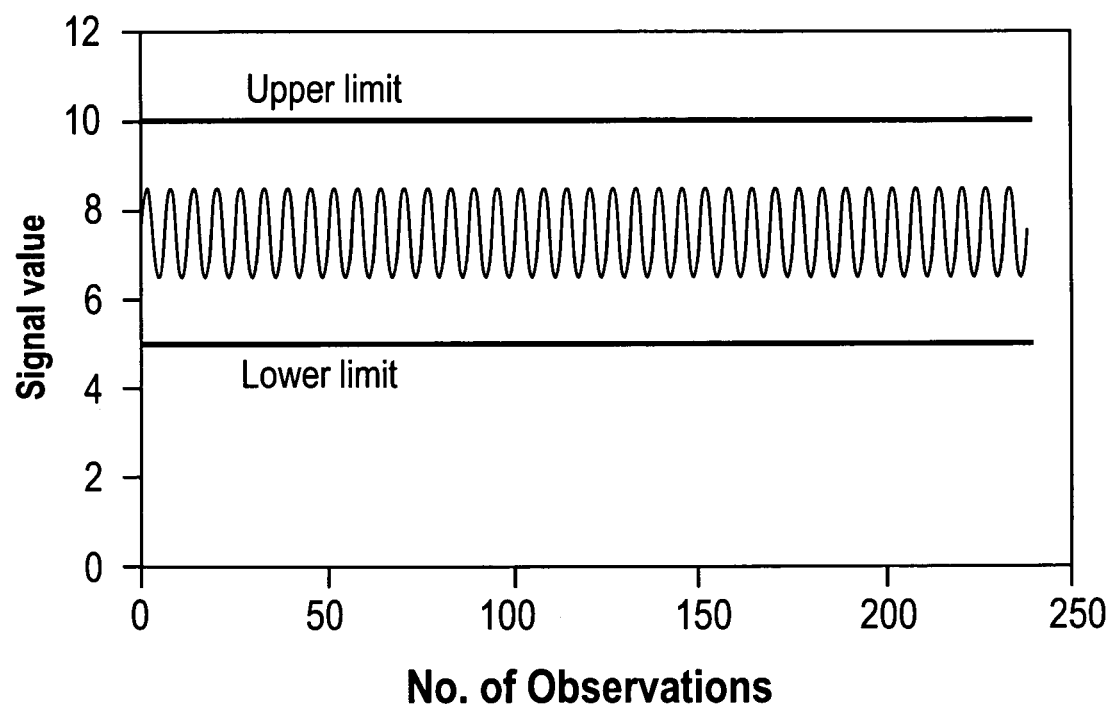
FIG. 4 is an illustrative plot of for example, a performance index, a key signal parameter, an environmental condition or an operational load, or their correlations under normal usage conditions.
Figure 5:
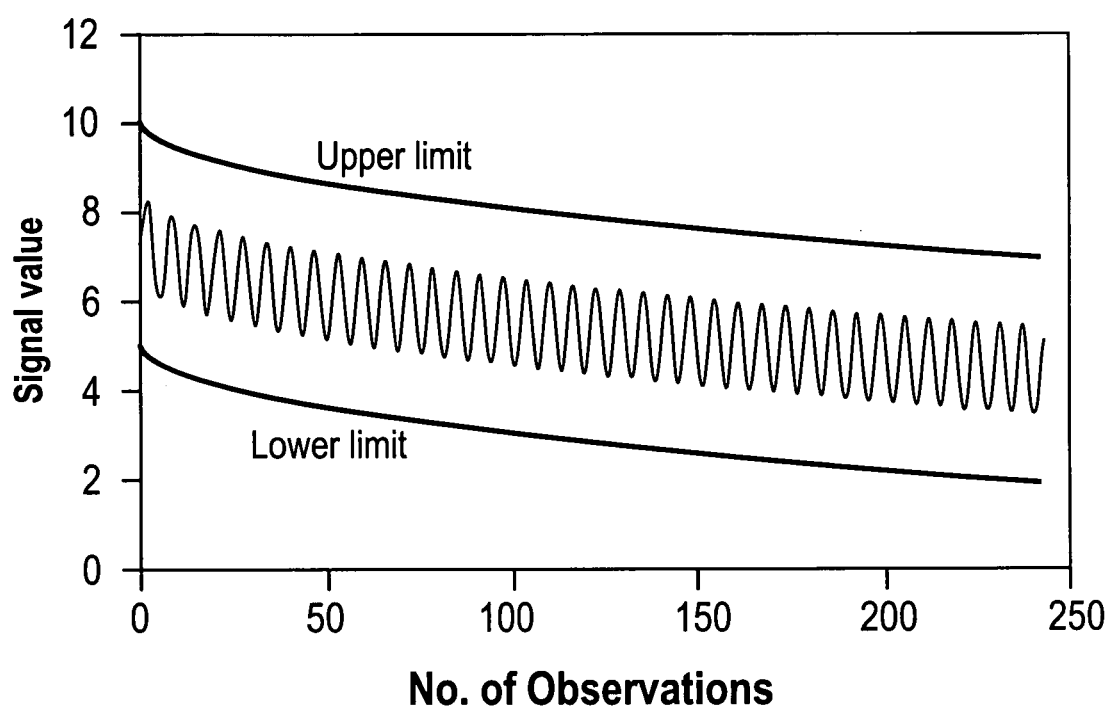
FIG. 5 is an illustrative plot for the same performance index, key signal parameter, environmental condition or operational load, or their correlations in the aging condition.

Many electronic products have natural aging problems. In order to distinguish the degradation caused by something other than the natural aging effect, it is necessary to have a built-in PHM algorithm and a local healthy baseline for the product and the product must also be able to update the local healthy baseline by itself. Therefore, when anomaly analysis is conducted, it will take into account the degradation caused by the aging effect. FIG. 4 shows an example of a measured value, be it a performance, a signal value or parameter, an environmental condition or an operational load, or their correlations in a normal usage condition. FIG. 5 is exemplary for that same performance, signal value, parameter, environmental condition or operational load, or their correlations in the aging condition. In the aging condition, if one still uses the healthy baseline from normal usage condition to monitor the health of the aging condition, it will give a false alarm, since the product's health space has already shifted. Therefore it is necessary to update the local healthy baseline in the aging condition.

For a discussion of the aging effect and how to take it into account, reference is made to co-pending provision application filed the same date as this application, the case titled *A Prognostic Method for Aging Systems*, Michael Pecht and Shunfeng Cheng, co-inventors.

While the foregoing is directed to embodiments of the present invention, other and further embodiments of the invention may be devised without departing from the basic scope thereof, and the scope thereof is determined by the claims that follow.

The invention claimed is:

1. A method for determining the quality of an individual electronic product including the reliability of said individual electronic product using both its own local healthy baseline, and a global healthy baseline derived from multiple units of the same electronic product comprising:
   establishing during the manufacturing process said individual electronic product's own local healthy baseline using electronically recorded and stored performance values, signal values, or calculated parameters, along with electronically recorded environmental and operational loads, or their correlations measured during manufacturing;
   establishing a global healthy baseline built from multiple local healthy baselines derived during the manufacturing process from multiple units of said same electronic product;
   electronically storing the said local and global healthy baselines within said electronic product or within an external database; and,
   with the aid of a computer, comparing performance, signal values and parameters, environmental and operational load, or their correlations of the said individual electronic product against said global healthy baseline for said same electronic product in a product screening or diagnostics step which is performed during the manufacturing process for anomaly detection, to confirm that said individual electronic product meets performance specifications.

2. The method of claim 1, wherein the establishing of the said healthy baselines includes a feature extraction methodology.

3. The method of claim 2, wherein the feature extraction methodology is selected from a univariate method or a multivariate method.

4. The method of claim 3, wherein the univariate method is selected from one of the group of methods comprising distribution mean, standard deviation, maximal value, minimal value, kurtosis, skewness, root mean square, number of occurrences above the threshold, cycle mean, cycle range, cycle ramp rate, and natural frequency.

5. The method of claim 3, wherein the multivariate method is selected from one of the group comprising Mahalanobis distance value, principal components analysis value, covariance, correlation factor and residual value obtained from regression analysis or multivariate state estimation technique.

6. The method of claim 2, wherein the establishing of the said local and global healthy baselines is carried out in manufacturing and is updated in the field.

7. The method of claim 1, wherein the establishing of the said healthy baselines includes using a PHM algorithm.

8. The method of claim 7, wherein the PHM algorithm is stored in the product.

9. The method of claim 7 wherein the PHM algorithm is stored in a company database.

10. The method of claim 1, wherein the local healthy baseline is stored in the product or in a company database.

11. The method of claim 1, wherein anomaly detection includes the following statistical approaches: test of T-distribution, test of the mean shifts, test of the standard deviation shifts, test of the kurtosis shifts, test of the skewness shifts, test of the number for outlier, sequential probability ratio test, statistical process control, test of the Mahalanobis distance value shifts, test of the change for correlations between different parameters, and test of the residual value obtained from regression analysis or multivariate state estimation technique shift.

12. The method of claim 1, wherein when an anomaly or failure is detected, projection pursuit analysis is used to identify critical parameters and identify the related physical components.

13. The method of claim 12, wherein future diagnostics includes the detection for no trouble found, no fault found, and intermittent failure analysis.

14. The method of claim 12, wherein the prognostics includes the prognostics distance calculation before failure happens by trending the degradation of the performance, signal values and calculated parameters, environmental and operational loads, or their correlations.

15. The method of claim 1, wherein when an anomaly or failure is detected, the information is recorded in an electronic memory for future diagnostics and prognostics.

16. The method of claim 1, wherein the electronic product includes electronic parts, components, boards, assemblies, devices, systems, and systems of systems.

* * * * *